United States Patent [19]

Schmid

[11] 4,329,110
[45] May 11, 1982

[54] MANIPULATING DEVICE, PARTICULARLY FOR INDUSTRIAL ROBOTS

[75] Inventor: Peter Schmid, Evilard, Switzerland

[73] Assignee: Societe Suisse pour l'Industrie Horlogere Management Services S.A., Biel, Switzerland

[21] Appl. No.: 177,497

[22] Filed: Aug. 12, 1980

Related U.S. Application Data

[63] Continuation of Ser. No. 971,672, Dec. 21, 1978, abandoned.

[30] Foreign Application Priority Data

Dec. 29, 1977 [CH] Switzerland ............... 16164/77

[51] Int. Cl.$^3$ .............................................. B66C 1/42
[52] U.S. Cl. ................................... 414/730; 414/917; 414/738
[58] Field of Search ............... 414/730, 738, 739, 740, 414/741, 744 A, 917, 733

[56] References Cited

U.S. PATENT DOCUMENTS 3,247,978  4/1966  Neumeier .
3,259,254  7/1966  Mitchell ........................ 414/730
3,630,389  12/1971  Schmidt .
3,703,968  11/1972  Uhrich .
3,792,782  2/1974  Melton .
3,934,702  1/1976  Snyder et al. .................. 414/730 X
3,995,746  12/1976  Usagida .

FOREIGN PATENT DOCUMENTS

2452345  5/1976  Fed. Rep. of Germany .
1458379  10/1966  France .

Primary Examiner—Trygve M. Blix
Assistant Examiner—Terrance L. Siemens
Attorney, Agent, or Firm—Frishauf, Holtz, Goodman & Woodward

[57] ABSTRACT

The invention refers to a manipulating device, particularly for industrial robots, comprising an articulated gripping arm located and extending from a support, of the kind in which the articulated gripping arm comprises a lever system with at least a first, a second and a third member pivotally connected with the pivot axes parallel to each other, the first member being pivotally connected at the support. Such manipulating devices are equipped with at least two drive units to move a driven member to a predetermined angular relationship with respect to a preceding member or to the support as the case may be. A gripper or tool is located at the free end of the last (outermost) member. The invention particularly concerns manipulating devices for the purposes of the watch industry where relatively small parts must be precisely manipulated.

14 Claims, 8 Drawing Figures

MANIPULATING DEVICE, PARTICULARLY FOR INDUSTRIAL ROBOTS

This is a continuation of application Ser. No. 971,672 filed Dec. 21, 1978 now abandoned.

The scarcity and rising cost of trained workers and the demand for higher productivity have led to the development of manipulation devices known as industrial robots. Remotely controlled robot manipulators have been developed for use in environments dangerous for human hands or subject to contamination by the presence of living tissue. Automatic manipulating robots which can be programmed for motion in several motion axes and are provided with a gripper or a tool have become important for economic reasons even for operating robots in man-compatible environments.

BACKGROUND AND PRIOR ART

The human arm constitutes a gripping device whose capabilities can only incompletely be reproduced by mechanical devices. There has, however, been an effort made to build manipulating devices for industrial robots which can make movements such as a man can make with his arm and hand. In some cases, it is even tried to design the manipulating device to be capable of carrying out tasks man can only handle with difficulties, as for example, motions which must be repeated with high precision.

A known manipulating device uses a rotatable support mounted on a stand. On this support a lever system with three pivotally connected members is swung. At the end of the last member a gripper or a tool is provided. The motion of the gripper within a vertical plane through the (usually vertical) axis of the rotatable support is produced by three drive units. The dirve unit for the first member is located on the support, the drive unit for the second member is located on the first member and the drive unit for the third member is located on the second member. A fourth drive unit produces swivelling of the lever system around the normally vertical support axis. This known manipulating device is very cumbersome in operation because the lever system must also carry the weight and bulk of the second and third drive units. Because of the weight of these drive units there is a tendency for flexing which may substantially affect the precision of positioning. It is not possible to obtain high positioning velocities because the mass of the accelerated parts is high so that it may be difficult to execute manipulation without exciting undesirable vibration.

THE INVENTION

It is, therefore, an object of the present invention to improve manipulating devices of the kind above described so that a high positioning accuracy and a high positioning velocity is possible, while at the same time the device will be simple in design and versatile in operation.

Briefly, accordingly to the present invention, the first member of the articulated arm forms part of a first lever parallelogram, the second and third members form part of a second lever parallelogram having a member in common with the first lever parallelogram, an elevation lever system is provided which is pivoted to the second lever parallelogram to set the elevation of the gripper, and the first and second drive units are located on the support, and likewise the drive for the elevation lever system, which makes it unnecessary to provide any other drive unit for the third member. Accordingly, the lever system is therefore light, but can nevertheless be designed to avoid substantial flexing. This permits a high accuracy of positioning for the gripper and also a high positioning velocity.

In order that the gripper may be moved in more than one plane, the support is preferably rotatably mounted on a stand and a fourth drive unit can be provided in known manner to rotate the support to a predetermined position. The jaws of the gripper may be rotated by belt drive from still another drive unit, located on the support, and moved together and apart by a hydraulic actuator.

The elevation lever system advantageously comprises two pivotally connected levers of which one is connected to the support and the other one is connected pivotally to a member of the second lever parallelogram. In this way the gripper can be maintained in the desired elevation. Generally, it is preferable when the gripper can assume different elevations. It is, therefore, of advantage when the elevation lever system comprises two pivotally connected levers of which one is pivotally connected to the support and the other one is pivotally connected to a member of the second lever parallelogram and in which a third drive unit is provided to move the lever which is pivotally connected to the support into a predetermined angle to the support so as to determine the elevation of the gripper by means of that other lever and the lever parallelogram to which it is connected.

Stepping motors are particularly suited for service as drive units in manipulating devices. It is preferably provided that the first member pivoted to the support and a further member also pivoted to the support and belonging to the first lever parallelogram comprise a gear segment meshing with a pinion of the first and the second drive unit, respectively. On each gear segment a second gear segment can be provided which by spring force is movable relative to the first gear segment to provide power transmission in both directions without backlash.

Another aspect of the invention is a method of providing the control pulses for the stepping motors of the drive units of a manipulating device of an industrial robot. For this purpose, a manipulating device is made which is identical, except for the drive units and except, possibly, as to scale with one or more manipulating devices to be controlled, and is mounted in a position convenient for manual operation, which is to say by moving the gripper body and actuating the closing mechanism of the gripper directly by hand. Instead of the stepping motors, the manually operated device has incremental pulse generators. The output of the incremental pulse generator is then recorded and the record is then used through a suitable pickup for picking up and directing to the appropriate stepping motors the various series of pulses, in order to cause a robot to execute the same set of movements automatically as many times as desired. In the recording step, the pulses may be generated by a manipulating device of large scale directly connected to the corresponding drive units of a working-scale robot used for verifying the miniature robot operations programmed by the manual operations on a larger scale with larger pieces that are more easily manipulated manually.

The invention will now be further described by way of illustrative example with reference to the annexed drawings, in which.

Figures 1, 2:
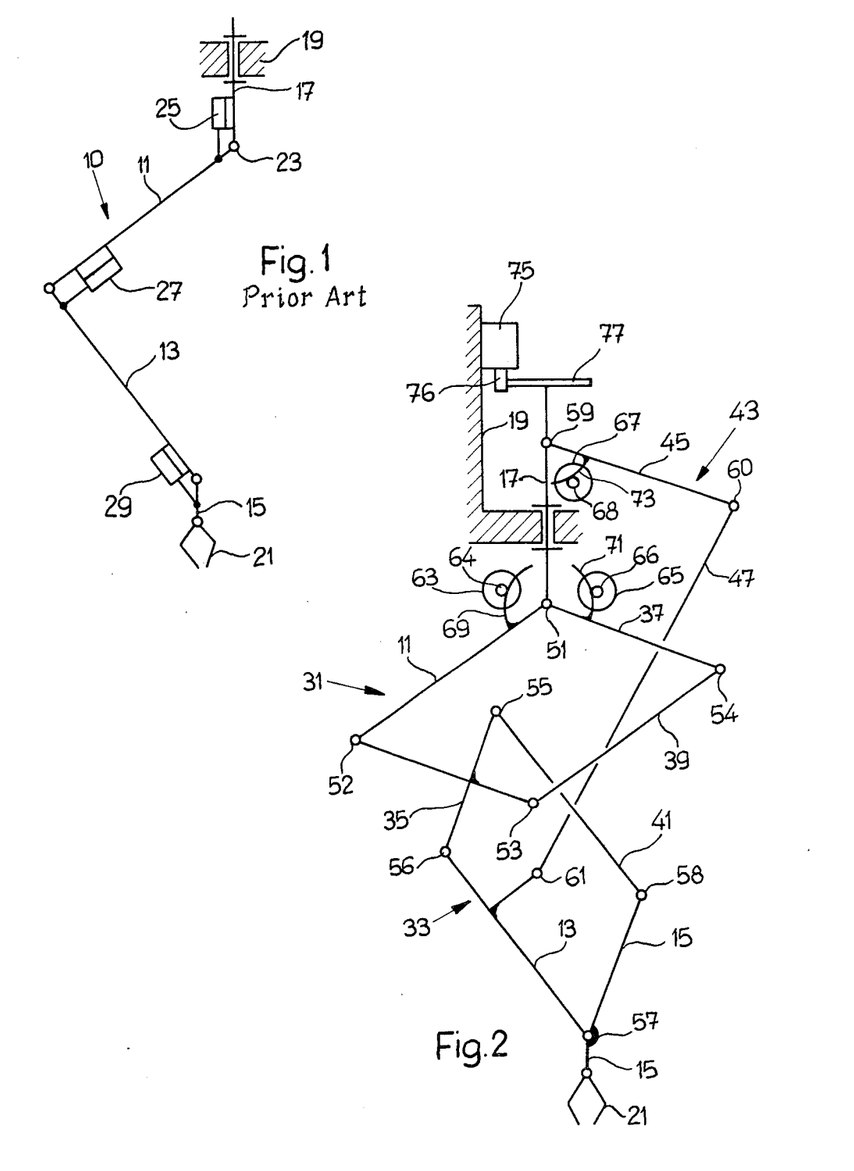
FIG. 1 shows a schematic representation of a prior art manipulating device consisting of a rotatable support and a three-member lever system operating a gripper.
FIG. 2 shows a schematic representation of the manipulating device of the present invention.

The prior art manipulating device previously referred to is shown schematically in FIG. 1. In that device, a gripping arm 10 comprising three members 11, 13, and 15 is pivotally connected to the rotary support 17. The support 17 is rotatable on a stand 19. At the end of the gripping arm 11 is a gripper 21. To swing the first member 11 around the suspension axis 23 a hydraulic cylinder 25 is located on the support 17. To pivot the members 13 and 15 corresponding hydraulic cylinders 27 and 29 are located on the members 11 and 13. The disadvantages of this design have already been explained before.

In an embodiment of the invention shown schematically in FIG. 2, a gripping arm is built in a manner somewhat analogous to the gripping arm in FIG. 1, with the corresponding parts given the same reference numerals used in FIG. 1, but in this case, however, the first, second, and third members 11, 13, and 15 form parts of two lever parallelograms 31 and 33. These lever parallelograms 31 and 33 have a common member 35, which has separate and differently aligned pairs of pivots 52,53 and 55,56, for the first and second parallelograms respectively. These pairs of pivots are located in fixed relation to each other on the member 35. The lever parallelogram 31 comprises in addition to the members 11 and 35 also the members 37 and 39. The second lever parallelogram 33 comprises in addition the members 13, 15, and 35 also the member 41. An elevation lever system 43 comprising the levers 45 and 47 is provided to determine the elevation of the gripper 21. All pivot axes 51 to 61 of the lever system are arranged parallel to each other. On the support 17 there are three drive units in the form of stepping motors 63, 65, and 67 whose pinions 64, 66, and 68 act through gear segments 69, 71, and 73 fixed on the members 11, 37, and 45. In some cases when it is not desired to bring the gripper 21 to different elevation levels, the lever 45 may be connected rigidly to the support 17. In this case also the stepping motor 67 may be omitted. If no tilting motion of the gripper is desired, lever 37 could be rigidly connected to support 17, in which case also the stepping motor 65 could be omitted. The lever 15 has an extension beyond the parallelogram pivot 57 to carry the gripper 21, and the extension need not be continued in the direction of the member 15. The stepping motor 65 controls the tilt of the member 15 and hence of the gripper 31 by controlling the tilt of the parallel portions of the opposite members 37 and 35 of the first parallelogram, and thereby the tilt of the parallel portions of the opposite members 35 and 15 of the second parallelogram. The common member 35 of the two parallelograms conveniently introduces a fixed angular relation and consequently has two pairs of end pivots.

On the stand 19 also a further stepping motor 75 is provided, whose pinion 76 can drive a gear or gear segment 77 to rotate the support 17 and the gripping arm suspended therefrom.

A practical embodiment of the manipulating device shown schematically in FIG. 2 is shown in FIGS. 3 to 6. In these figures, the same parts or assemblies are again referred to by the same reference numerals.

Figure 3:
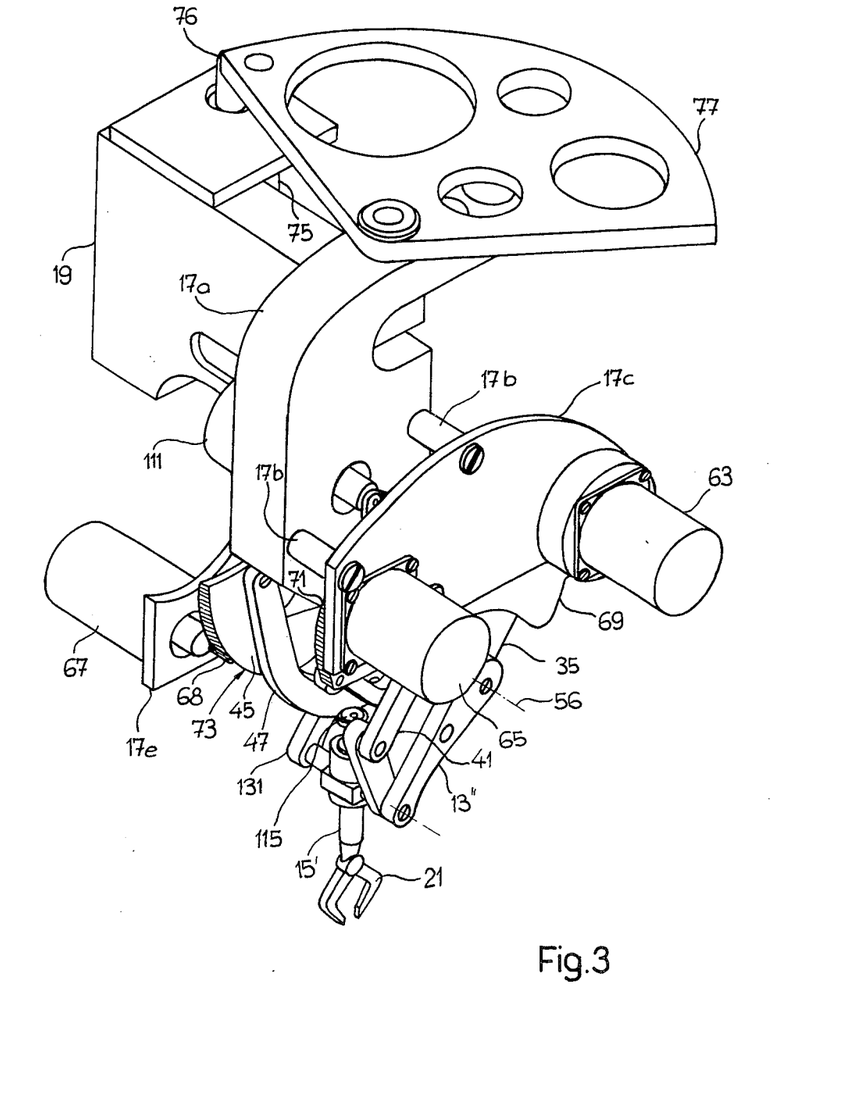
FIG. 3 shows a perspective representation of a practical embodiment of the manipulating device of the invention.
Figure 4:
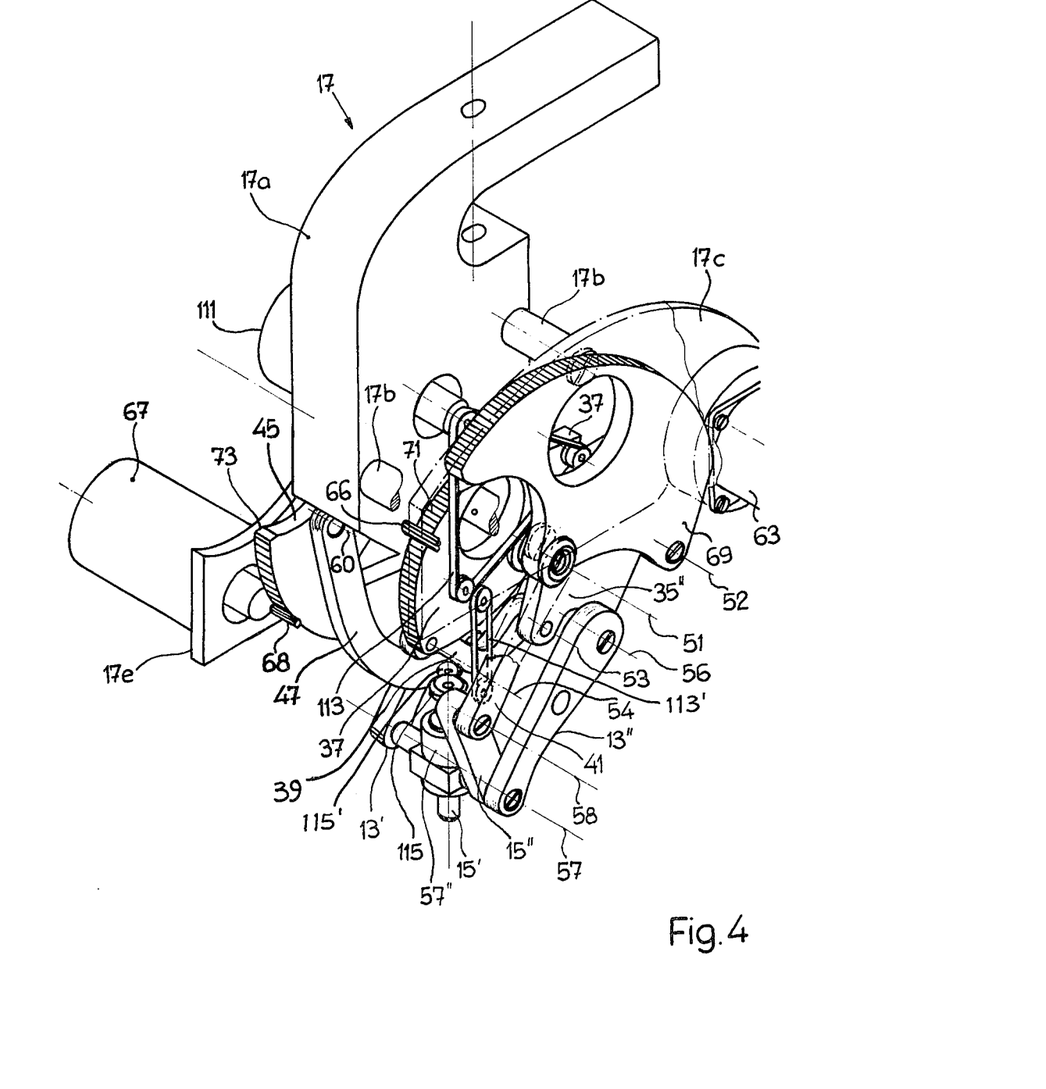
FIG. 4 shows a perspective representation as in FIG. 3, of the same implementing device, but with some parts omitted to make other parts visible.

The support 17 has a block 17a pivotally connected on the stand 19. On one side of the block 17a, a plate 17c is connected by spacer bolts 17b. On the plate 17c, the stepping motors 63 and 65 are located (FIG. 3). Also on the other side of the block 17a, a plate 17e is mounted on spacers (not shown, but in FIG. 6, the screws 17d are visible). On the plate 17e, the stepping motor 67 is mounted.

Figure 5:
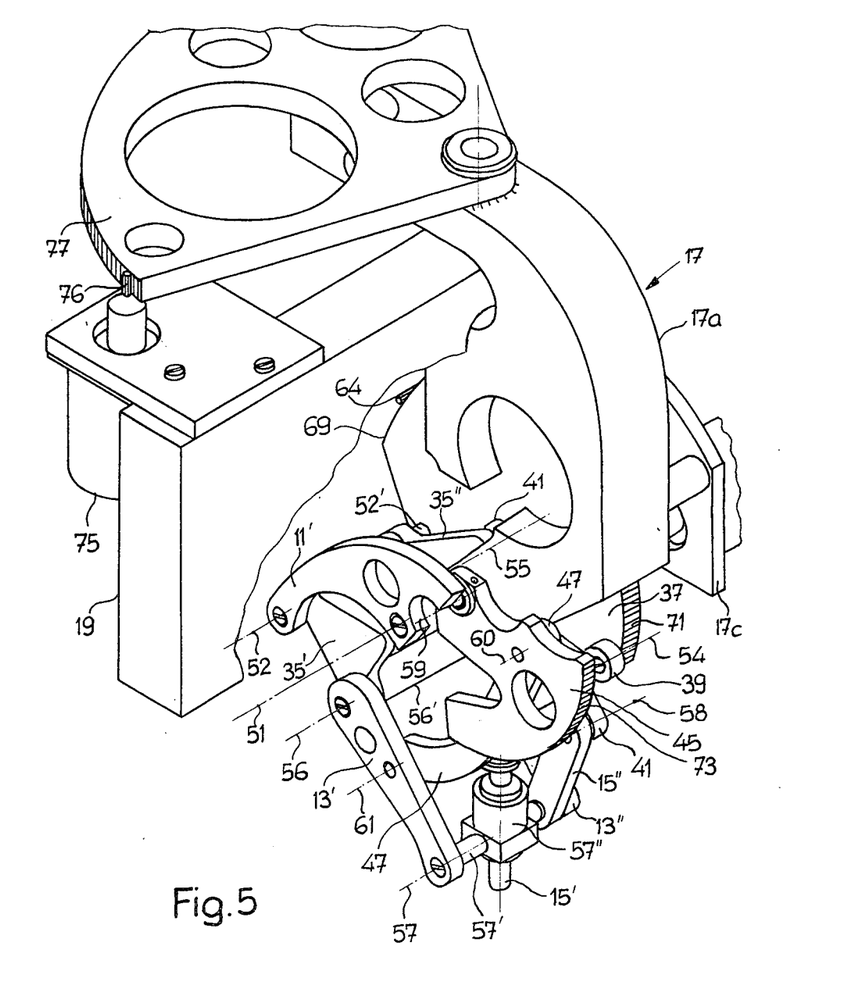
FIG. 5 shows a perspective representation of the device of FIGS. 3 and 4, but from another side with some parts omitted.

The pinion 64 (FIG. 4) of the stepping motor 63 meshes with the gear segment 69 which is mounted on a shaft (not shown), rotatably supported in block 17a. The rotation axis 51 (see FIG. 2) is indicated by reference numeral 51. The shaft is connected to the member 11' (FIG. 5). The gear segment 69 and the member 11' are further connected together by a bolt (not shown). In such a way the part 69 and 11' form a member corresponding to member 11 of FIG. 2, but having two parallel arms connected together by a bolt. The bolt 52' forms the rotational axis 52 on which the levers 35' and 35" corresponding to the lever 35 of FIG. 2 are fixed. Therefore, on this embodiment also the member 35 of FIG. 2 is replaced by two levers 35' and 35" located at a distance from each other. The levers 35' and 35" are further connected by a bolt 56' which forms also the rotational axis 56 for the two levers 13' and 13" located in parallel at a distance from each other. These levers 13' and 13" correspond to the member 13 of FIG. 2.

Figure 6:
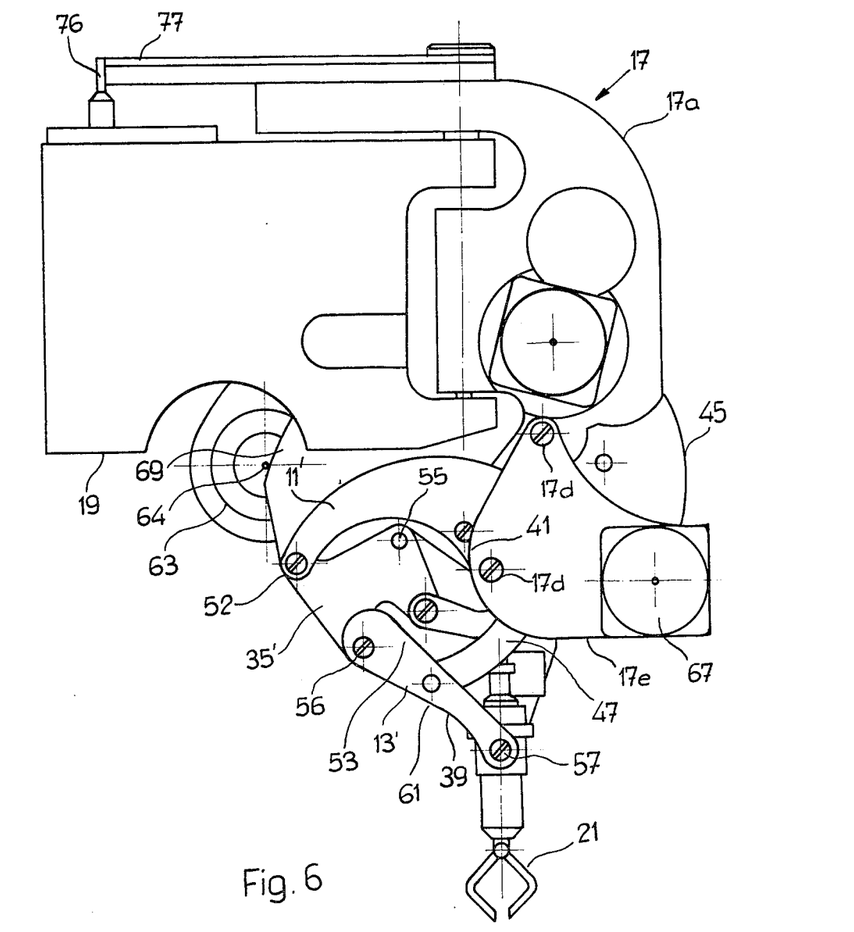
FIG. 6 shows a view of the devices of FIGS. 3-5 from the same side as in FIG. 5, but not in perspective representation.

The shaft 57' is rotatably supported between the levers 13' and 13" at their lower end. The rotation axis 57 of the shaft 57' corresponds to the rotation axis 57 of FIG. 2. The shaft 57' has a bearing 57" for receiving a rotatable spindle 15'. A lever 15" is fixed to the shaft 57' and the bearing 57". The spindle 15' and the lever 15" correspond to the lever member 15 of FIG. 2 which is rotatable on the axis 57. At the end of the spindle 15' is the gripper 21 (FIGS. 2, 6).

The pinion 66 of the stepping motor 65 meshes with the gear segment 71 forming the lever 37 rotatably supported on the axis 51. The lever 39 is pivotally secured at the lever 37 at 54. The lever 39 is pivotally connected at 53 with the lever 35".

In the described embodiment (FIGS. 3 to 6), the first parallelogram 33 (FIG. 2) comprises the parallel parts 69 and 11', the parallel parts 35' and 35" and the lever members 37 and 39.

The lever 35 of FIG. 2 has four pivots 52, 53, 55, and 56. In describing the embodiment according to FIGS. 3 to 6, the corresponding pivots 52, 53 have already been mentioned. The lever member 41 is pivotally secured at the lever 35" at the point 55. The lever member 41 itself is pivotally connected at 58 to the lever 15".

In the described embodiment (FIGS. 3 to 6, the second parallelogram 33 (FIG. 2) consists also of the parallel parts 13' and 13", the connected parts 15", 57' and 57", the connected levers 35' and 35" and the lever member 41.

The pinion 68 of the stepping motor 67 meshes with the gear segment 73 (FIG. 4) which is part of the lever member 45. The lever member 45 is pivotally connected at 59 at the block 17a and at 60 further connected to a further lever member 47 which is pivotally connected at 61 with the lever 13'.

Figure 7:
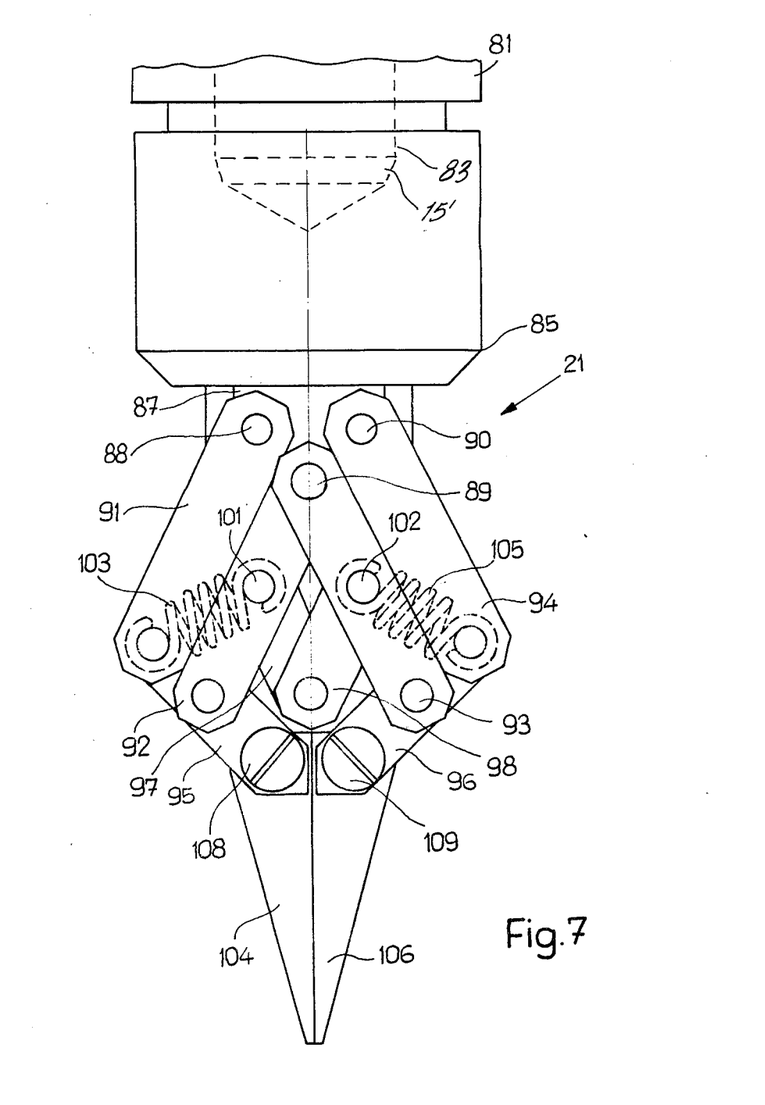
FIG. 7 shows the gripper in closed position.
Figure 8:
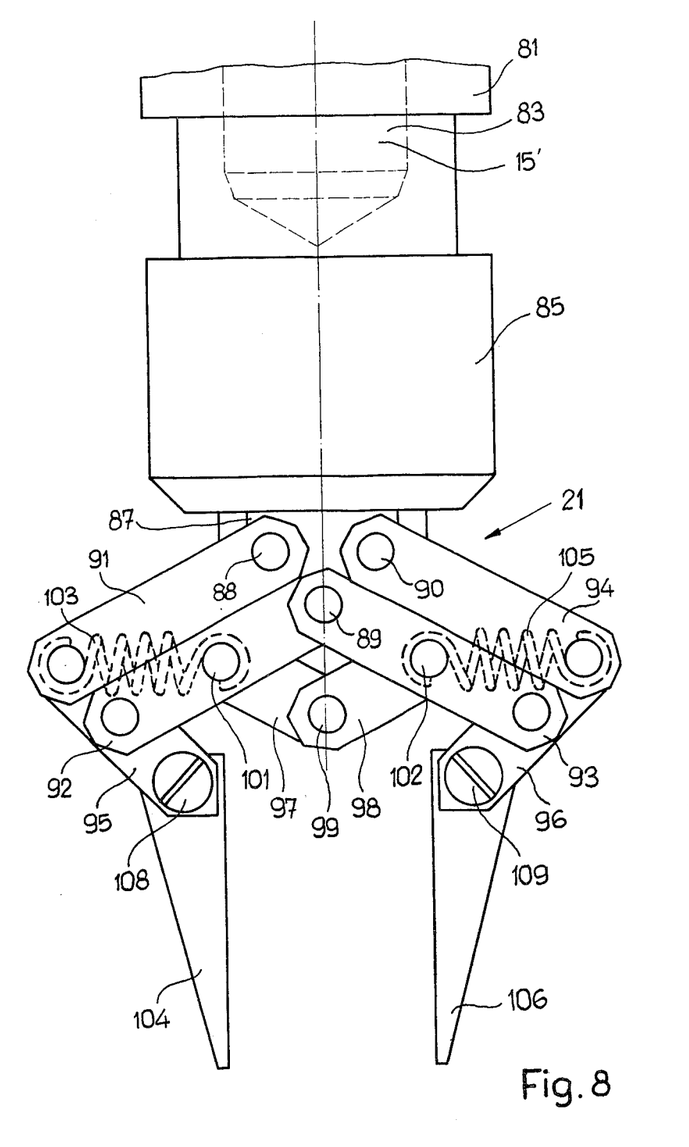
FIG. 8 shows the gripper in opened position.

Referring to FIGS. 7 and 8, a preferred embodiment of the gripper 21 is further described. The gripper 21 is rigidly mounted on the part 15' (FIG. 5). For this purpose the support 81 has a bore 83 receiving the end of the part 15'. The support 81 can then be secured by fastening means not shown, e.g., a screw. On the support 81 is an axially movable bushing 85 having on two sides an arm 87. At each arm 87 four parallel levers 91, 92, 93, 94 are pivotally connected on three studs. Two pairs of parallelogram levers 91, 92, and 93,94, respectively, form together with the arm 87 and a further lever 95 and, respectively, 96. At the studs 101, 102 each parallelogram is pivotally connected with a connecting lever 97, 98, respectively. The connecting levers 97, 98 are pivotally connected to a common pivot 99 located on the support 81. The gripping claws 104 and 106 are connected by screws 108, 109, or the like to the parallelograms. By springs 103, 105 the gripper is normally held in the position shown in FIG. 7. However, if the bushing 85 is moved down by an actuating member (not shown) e.g., a hydraulic cylinder, the gripper 21 is opened (FIG. 8). It is to be noted that on the described embodiment the gripping claws 104, 106 are moved in a practically horizontal plane, and guided in parallel realationship. For many applications this is of advantage. This facilitates considerably, for example, the safe gripping of small parts.

It remains to be mentioned that the spindle 15' (FIGS. 4 and 5) is rotatable on its own axis in a bearing 57". This spindle can be driven by a stepping motor 111. This takes place by a gear belt 113 (FIG. 4), a further gear belt 113' driving a worm 115' meshing with the worm gear 115 of the spindle 15' and rotating the orientation of the gripper jaws 104,106.

Preferably, on each of the gear segments 69,71 and 73, a second gear segment is provided, which spring force, is movable relative to the gear segment 69,71 or 73, as the case may be, to provide power transmission in both directions without backlash.

In the use of an industrial robot, the programming of the manipulating device can take place in different ways. For example, it is possible to mount incremental pulse generators, instead of drive units on a manipulating device. In this case, the manipulating device can be operated manually to carry out the desired operations and the signals of the incremental pulse generators can be stored, for example, on a magnetic tape. This data storage can then be read to control a manipulating device provided with drive units, so that the manipulating device automatically repeats the motions previously made. When this kind of programming is used for manipulating small parts, difficulties could occur because very fine motions must be made. In such case, it is advisable to electrically couple a manipulating device provided with drive units together with a manipulating device provided with incremental pulse generators and made on a larger scale, for example, five times larger, so that the smaller device follows accurately the motion of the larger device, but on a smaller scale, the signals of the incremental pulse generators again being stored. This stored information can then be called out of storage to control a manipulating device in such a way that the registered motions are automatically repeated.

I claim:

1. A manipulating device, particularly for industrial robots, comprising an articulated gripping arm located on and extending from a support, said articulated gripping arm comprising a lever system having at least first, second and third members pivotally connected and mounted with the pivot axes parallel to each other, said first member being pivotally connected to the support, said manipulating device further comprising at least one first and one second drive unit to move said members to predetermined angular relationships with respect to the support, and at least one gripper or tool mounted on the third member, and having the improvement which consists in that the first member (11) forms part of a first lever parallelogram (31); in that the second (13) and third (15) members form part of a second lever parallelogram (33) having a member (35) in common with the first lever parallelogram (31), and in that two members (11,37) of said first lever parallelogram (31) have the same pivot axis (51) on the support (17) and in that said two members (11,37) are in operative connection, respectively with said first and second drive units (63,65), each of which drive units is mounted on said support (17).

2. A manipulating device according to claim 1, wherein an elevation lever system (43) is provided which is pivoted to the second lever parallelogram (33) to set the elevation of said gripper (21) and which comprises two pivotally connected levers (45, 47) of which one (45) is rigidly connected to the support (17) and the other (47) pivotally connected to a member (13) of the second lever parallelogram (33).

3. A manipulating device according to claim 1, wherein an elevation lever system (43) is provided which is pivoted to the second lever parallelogram (33) to set the elevation of said gripper (21) and which comprises two pivotally connected levers (45, 47) of which one is pivotally connected to the support (17) and the other one to a member of said second lever parallelogram (33), and a third drive unit (67) is provided to move the lever (45) which is pivotally connected to the support (17) into a predetermined angle to the support (17) so as to determine the elevation of the gripper (21) by means of said other lever (47) and said second lever parallelogram (33).

4. A manipulating device according to claim 3, wherein said other lever (47) is pivotally connected to said second member (13).

5. A manipulating device according to claim 3, wherein said third drive unit (67) which drives the elevation lever system (43) is located on said support (17).

6. A manipulating device according to claim 5, wherein each said drive unit (63, 65, 67) is a stepping motor.

7. A manipulating device according to one of claims 1 to 6, wherein said first member (11) is pivoted on said support (17) and a further member (37) belonging to said first lever parallelogram (31) is also pivoted on said support, each having a gear segment (69,71) meshing with a pinion of the first and the second drive unit, respectively.

8. A manipulating device according to claim 5, wherein the lever (45) pivoted on said support (17) has a gear segment (73) meshing with a pinion of the third drive (67).

9. A manipulating device according to claim 1, wherein said second parallelogram includes a member (41) parallel to said second member and said second member (13) and said third member (15) is held by pivots respectively on said second member (13) and on said member (41) parallel thereto.

10. A manipulating device according to claim 1, wherein the support (17) is rotatably supported on a stand (19) and a fourth drive unit (75) is provided to rotate the support (17) into a predetermined position.

11. A manipulating device as claimed in one of the claims 1 to 5 and 12, wherein said gripper (21) is rotatable by a fifth drive unit 111 located on the support (17) through a gear belt drive 113, 113'.

12. A manipulating device according to claim 1, wherein said gripper (21) comprises two further lever parallelograms to guide the gripping claws (104, 106) in movement apart or together in parallel relationship.

13. A manipulating device according to claim 12, wherein a gripper support (81) with a bushing (85) axially movable by a drive member is provided on said third member (15), and two pivots (88, 89; 89, 90) of each lever parallelogram of said gripper (21) are located on the axially movable bushing, and each lever parallelogram of said gripper is pivotally connected to said gripper support (81) by a connecting lever.

14. A manipulating device according to claim 1, wherein said member (35) common to said first and and second lever parallelograms has two pairs of pivot connections, all pivot axes being parallel but the axes of said pairs lying in intersecting planes, the pivots of one said pair serving for connection to members of said first parallelogram and those of the other said pair serving for connection to members of said second parallelogram.

* * * * *